(12) United States Patent
Kawakita

(10) Patent No.: US 7,412,909 B2
(45) Date of Patent: Aug. 19, 2008

(54) NON-STAGE TRANSMISSION AND DEVICE HAVING NON-STAGE TRANSMISSION

(76) Inventor: Katsuya Kawakita, 1089-1 Kamanokubocho, Gojo-Shi, 637-0084 Nara (JP)

( * ) Notice: Subject to any disclaimer, the term of this patent is extended or adjusted under 35 U.S.C. 154(b) by 56 days.

(21) Appl. No.: 10/901,739

(22) Filed: Jul. 28, 2004

(65) Prior Publication Data

US 2005/0192135 A1    Sep. 1, 2005

Related U.S. Application Data

(63) Continuation of application No. PCT/JP03/01147, filed on Feb. 4, 2002.

(30) Foreign Application Priority Data

Feb. 7, 2002    (JP) .............................. 2002-73292

(51) Int. Cl.
  *F16H 35/06*    (2006.01)
  *F16H 35/08*    (2006.01)
  *F16H 3/10*    (2006.01)
  *F16D 1/12*    (2006.01)

(52) U.S. Cl. ........................................ 74/395; 464/161

(58) Field of Classification Search .................... 477/37, 477/43, 107, 110, 115; 464/54, 61.1, 77, 464/161; 74/393, 395, 574
See application file for complete search history.

(56) References Cited

U.S. PATENT DOCUMENTS

| | | | | |
|---|---|---|---|---|
| 2,168,744 | A | * | 8/1939 | Perrine ......................... 474/12 |
| 4,572,031 | A | | 2/1986 | Yokooku et al. |
| 5,468,195 | A | * | 11/1995 | Kashiwabara ................. 477/46 |
| 6,063,003 | A | * | 5/2000 | Kubota et al. .................. 477/43 |
| 6,188,943 | B1 | * | 2/2001 | Uchida et al. .................. 701/54 |
| 6,537,169 | B1 | * | 3/2003 | Morii ............................. 475/8 |
| 6,549,840 | B1 | * | 4/2003 | Mikami et al. ................ 701/69 |

FOREIGN PATENT DOCUMENTS

JP    46-33056    9/1971

(Continued)

*Primary Examiner*—Tisha D Lewis
(74) *Attorney, Agent, or Firm*—Jeffrey D. Myers; Samantha A. Updegraff; Peacock Myers, P.C.

(57) ABSTRACT

The invention provides a non-stage transmission which shifts gear in response to a load without requiring any independent actuator for changing a change gear ratio, and can achieve a large change gear ratio on the basis of a small-sized and low-cost structure.

The non-stage transmission is structured such that a rocker arm 4 is reciprocated via a connection rod 18, a means for changing a stroke of the reciprocating motion is provided, and an output shaft 2 is driven in one direction whichever of forward and backward directions of the reciprocating motion of the rocker arm 4. An input side turning body 13 is structured such as to drive an output side turning body 14 via an energizing spring 12. The stroke of the reciprocating motion is changed by rotating a crank shaft lever by a cam groove 13*d* in a clockwise direction in correspondence to an increase of a load so as to shorten a distance between points Q, S. A torque and a rotational number of the output shaft are changed on the basis of a change of the stroke.

11 Claims, 16 Drawing Sheets

FOREIGN PATENT DOCUMENTS

| | | |
|---|---|---|
| JP | 50-130967 | 10/1975 |
| JP | 59-187145 | 10/1984 |
| JP | 62-139998 | 6/1987 |
| JP | 02169333 A * | 6/1990 |
| JP | 03107656 A * | 5/1991 |
| JP | 05-338474 | 12/1993 |
| JP | 8-508085 | 8/1996 |
| JP | 8-285031 | 11/1996 |
| JP | 63-009399 | 1/1998 |
| WO | WO 95/18931 | 7/1995 |
| WO | WO 03/067126 A1 | 8/2003 |

\* cited by examiner

NON-STAGE TRANSMISSION AND DEVICE HAVING NON-STAGE TRANSMISSION

TECHNICAL FIELD

The present invention relates to an apparatus for shifting gear a power generated by a motor, an internal combustion engine, a human power or the like, and more particularly to a non-stage transmission which can continuously execute a shift transmission.

BACKGROUND ART

In conventional, there has been widely known a non-stage transmission as a variable speed gear which can be always used in a high efficiency point of a power source and smoothly carries out a shift transmission. As a most prevail non-stage transmission, there is a structure which is constituted by a V-shaped belt and two pulleys having variable V-shaped grooves, and achieves a continuous change gear ratio by continuously changing a width of the V-shaped grooves. However, in the prior art mentioned above, an independent actuator (for hydraulic, motor) for changing the width of the variable V-shaped grooves of the pulley is required, it is hard to make the structure compact, and a high cost is required. Further, since a radius of curvature equal to or more than a certain level is required in the V-shaped belt, it is impossible to secure a large change gear ratio. Accordingly, an object of the present invention is to provide a non-stage transmission which does not require any independent actuator for shifting gear, has a small size and a low cost, and can secure a large change gear ratio, and a device having the non-stage transmission. In this case, the relation (change gear ratio)=(input side rotational speed)/(output side rotational speed) is established.

DISCLOSURE OF THE INVENTION

The present invention structures a non-stage transmission by applying a quadric crank mechanism such as a crank lever mechanism, a crank slider mechanism or the like, changing a turning radius of a drive side crank, having a stroke variable means for changing a reciprocating motion in a driven side, and arranging a means for driving an output shaft in one direction whichever of forward and backward directions the reciprocating motion is driven.

The driven side reciprocating motion stroke variable means mentioned above is structured such as to drive an output side rotating body from an input side rotating body via a spring, thereby changing a relative positional relation between the input side rotating body and the output side rotating body in a rotational direction on the basis of a magnitude of a load of the output shaft. A turning radius of the crank is changed and the driven side reciprocating motion stroke is changed by a means utilizing a contact relation between the input side rotating body and the output side rotating body by utilizing the changing relative positional relation.

The means utilizing the contact relation mentioned above is structured such that the input side rotating body is provided with a cam or a cam groove, a member oscillating around a position apart from a rotation center of the output side rotating body is provided, and the member has a portion brought into contact with a cam or engaging with a cam groove and a (rotation side) center of the crank.

The means for driving the output shaft in one direction whichever of the forward and backward directions the reciprocating motion mentioned above is driven is provided with a reciprocating member and a member driven in a reverse direction thereto, and a one-way clutch is mounted to each of the members. The one-way clutches mounted to the reciprocating member and the member driven in the reverse direction are structured such that either of two one-way clutches is always locked so as to drive the output shaft, and the non-locked one-way clutch is free so as to generate no resistance against driving the output shaft, by setting directions of the one-way clutches such that the case of driving in a direction of driving both the output shafts is a lock state, and the reverse direction thereto is a free state.

If the turning radius of the crank is set to 0 at the minimum time by the driven side reciprocating motion stroke variable means mentioned above, a change gear ratio is infinitely large, and it is possible to obtain a large change gear ratio which has not been obtained conventionally.

BEST MODE FOR CARRYING OUT THE INVENTION

Embodiment 1

Figure 1:
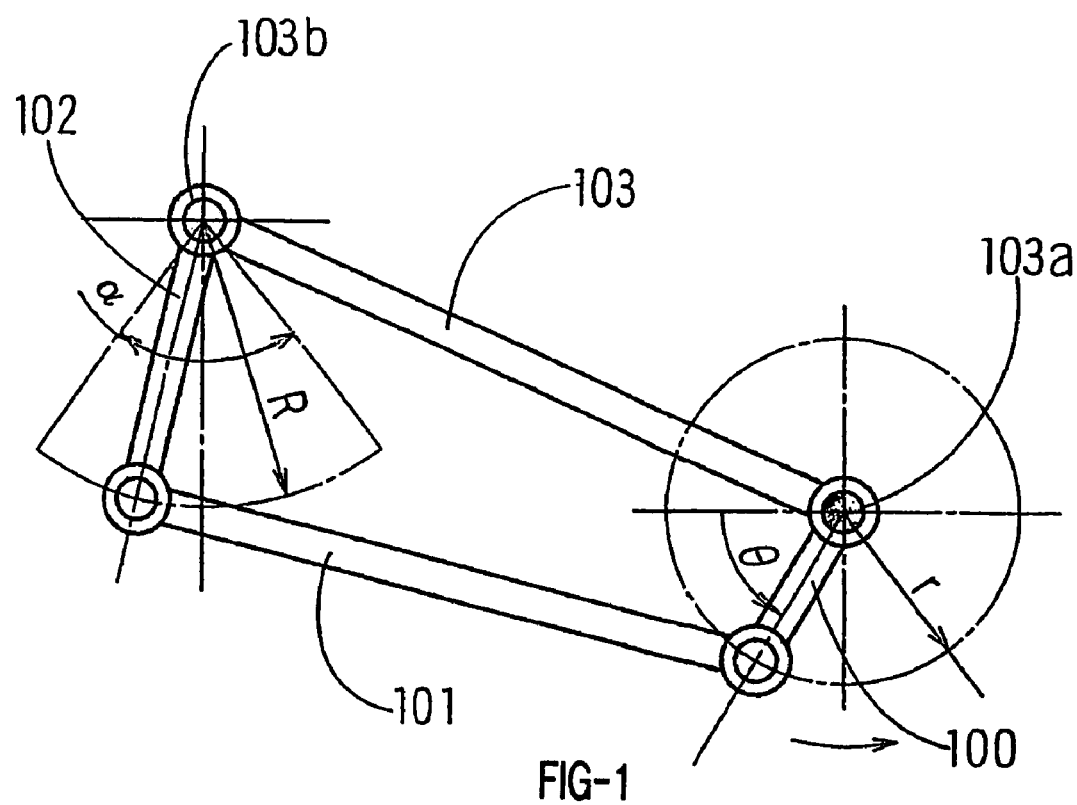
FIG. 1 is a view showing a basic structure in accordance with the present invention.

FIG. 1 is a view showing a quadric crank mechanism corresponding to a basic mechanism of the present invention. Reference numeral 100 denotes a crank, reference numeral 101 denotes a connection rod, reference numeral 102 denotes a rocker arm, and reference numeral 103 denotes a stationary link.

In this case, when the crank 100 rotates in a counterclockwise direction around a rotation center 103a, the rocker arm 102 is oscillated around a center 103b via the connection rod 101. A crank turning angle θ and an absolute value of a torque generated in the rocker arm are as shown in FIG. 3, and a great torque is generated in the rocker arm 102 near 0, 180 and 360 degrees corresponding to a dead center.

Figure 3:
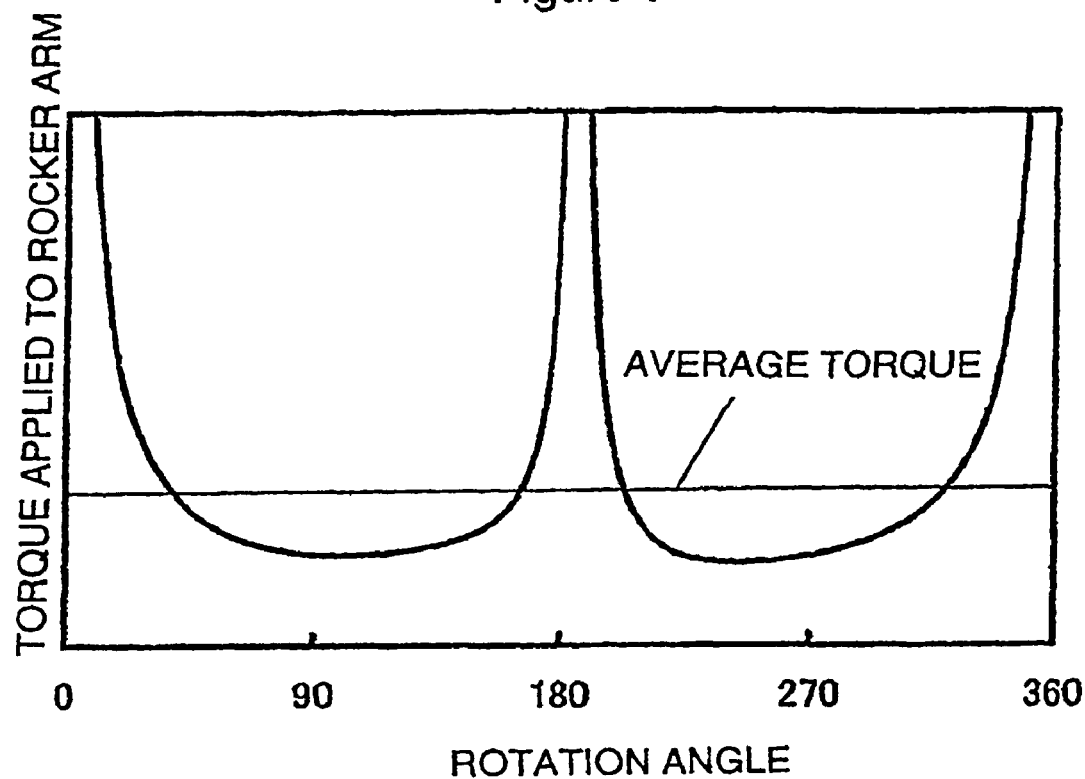
FIG. 3 is a view showing a modified aspect of the basic mechanism of the present invention.

However, since the crank turns at a certain degree of speed, and the rocker arm 102 has a moment of inertia, the torque is averaged as shown in FIG. 3.

In FIG. 1, in accordance that a crank radius r is changed, an oscillation angle α of the rocker arm 102 is changed, and a torque applied to the rocker arm 102 is changed. In the present invention, the structure is made such that the oscillation angle α of the rocker arm 102 is changed by changing the crank radius r, and the output shaft is driven in one direction whichever direction of forward and backward reciprocating directions the rocker arm 102 oscillates, whereby a continuous shift transmission is achieved. In this case, the relation an average change gear ratio=180/α is established.

Figure 2:
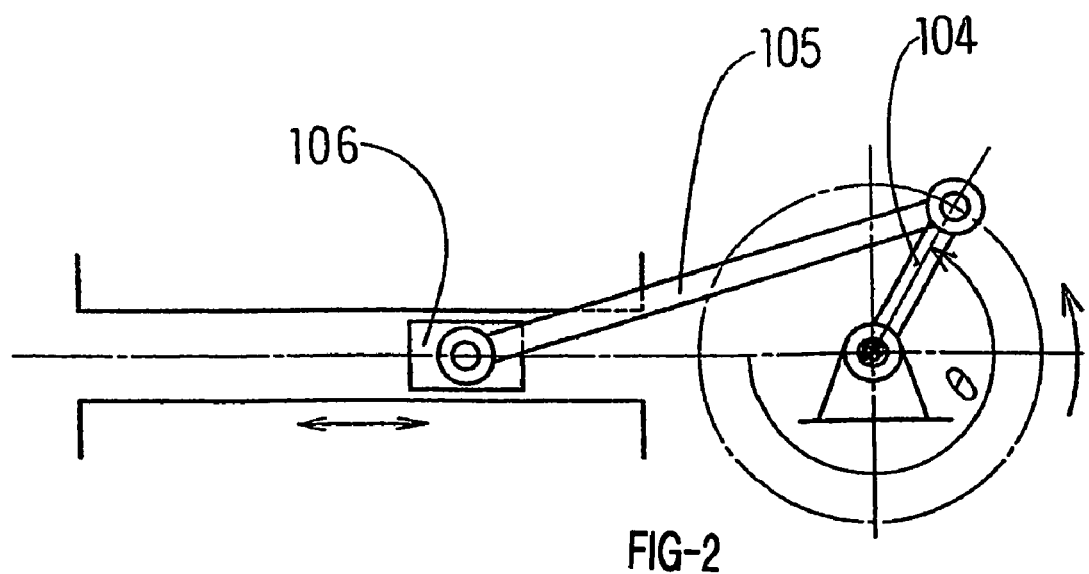
FIG. 2 is a view showing a relation between a crank turning angle in a quadric crank mechanism and a torque applied to a rocker arm.

If a length R of the rocker arm 102 is infinitely large in FIG. 1, a crank slider mechanism as shown in FIG. 2 is obtained, and there can be obtained a mechanism for reciprocating a slider 106 via a connection rod 105 by a rotating crank 104. In this mechanism, a non-stage transmission can be structured by forming the reciprocating slider 106 so as to drive the output shaft in one direction whichever direction of the forward and backward reciprocating directions, thereby being capable of changing the crank radius.

A description will be here given of a type of oscillating the rocker arm as shown in FIG. 1 which can be more simply structured.

Figure 4:
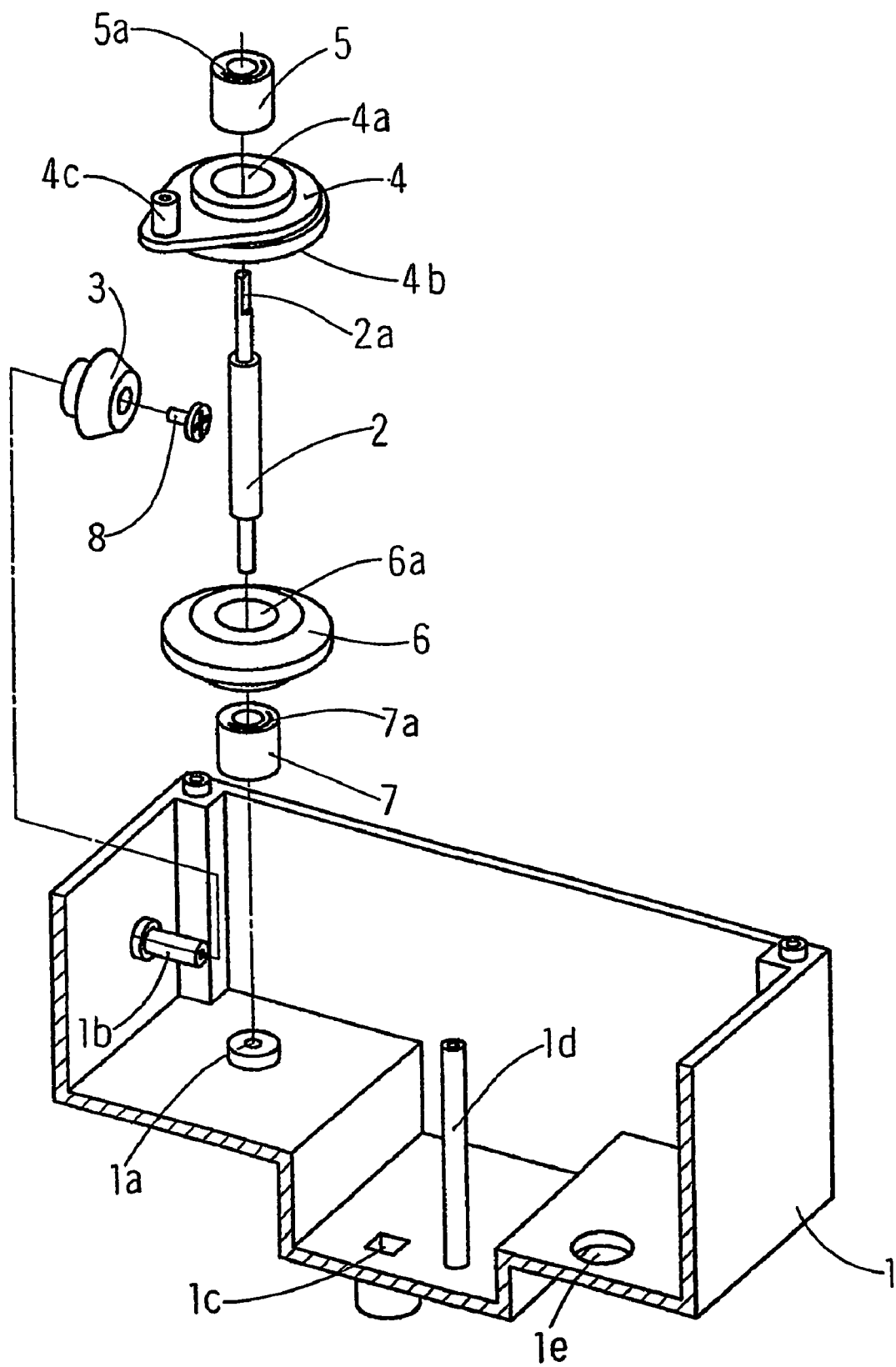
FIG. 4 is a view showing an assembly of a mechanism for changing a reciprocating oscillation to a one-way rotation.

First, a structure of the clutch is shown. FIG. 4 shows a cross sectional view, in which reference numeral 1 denotes a case. The case 1 has a shaft hole 1a to which an output shaft 2 is inserted, and a rotation shaft 1b of a transmission bevel gear 3. Further, the case 1 has an adjustment hole 1c to which an adjusting part for adjusting a shift transmission property mentioned above is inserted, a turning shaft 1d of a turning body, and a positioning hole 1e of the motor. A material of the output shaft 2 is a stainless steel which has a strong resistance against an abrasion, and a shaft leading end has a D-cut portion 2a. Reference numeral 4 denotes a rocker arm. The rocker arm 4 has an insertion hole 4a to which a first one-way clutch 5 is inserted, a bevel gear portion 4b and a drive shaft 4c driven by a connection rod mentioned below. An engraved mark 5a showing a lock direction is provided in the first one-way clutch 5. Reference numeral 6 denotes a bevel gear. The bevel gear 6 has an insertion hole 6a to which a second one-way clutch 7 is inserted. An engraved mark 7a showing a lock direction is provided also in the second one-way clutch 7. Reference numeral 8 denotes a screw for preventing the transmission bevel gear 3 from coming off.

The first one-way clutch 5 is inserted to the insertion hole 4a of the rocker arm 4 and is fixed thereto by a press fitting, an adhesive bonding or the like. The second one-way clutch 7 is also inserted and fixed to the bevel gear 6. The output shaft 2 is inserted to the first and second one-way clutches 5 and 7 at the same time of being inserted to the hole 1a of the case 1. The transmission bevel gear 3 is inserted to the turning shaft 1b and is prevented by the screw 8 from coming off.

Figure 5:
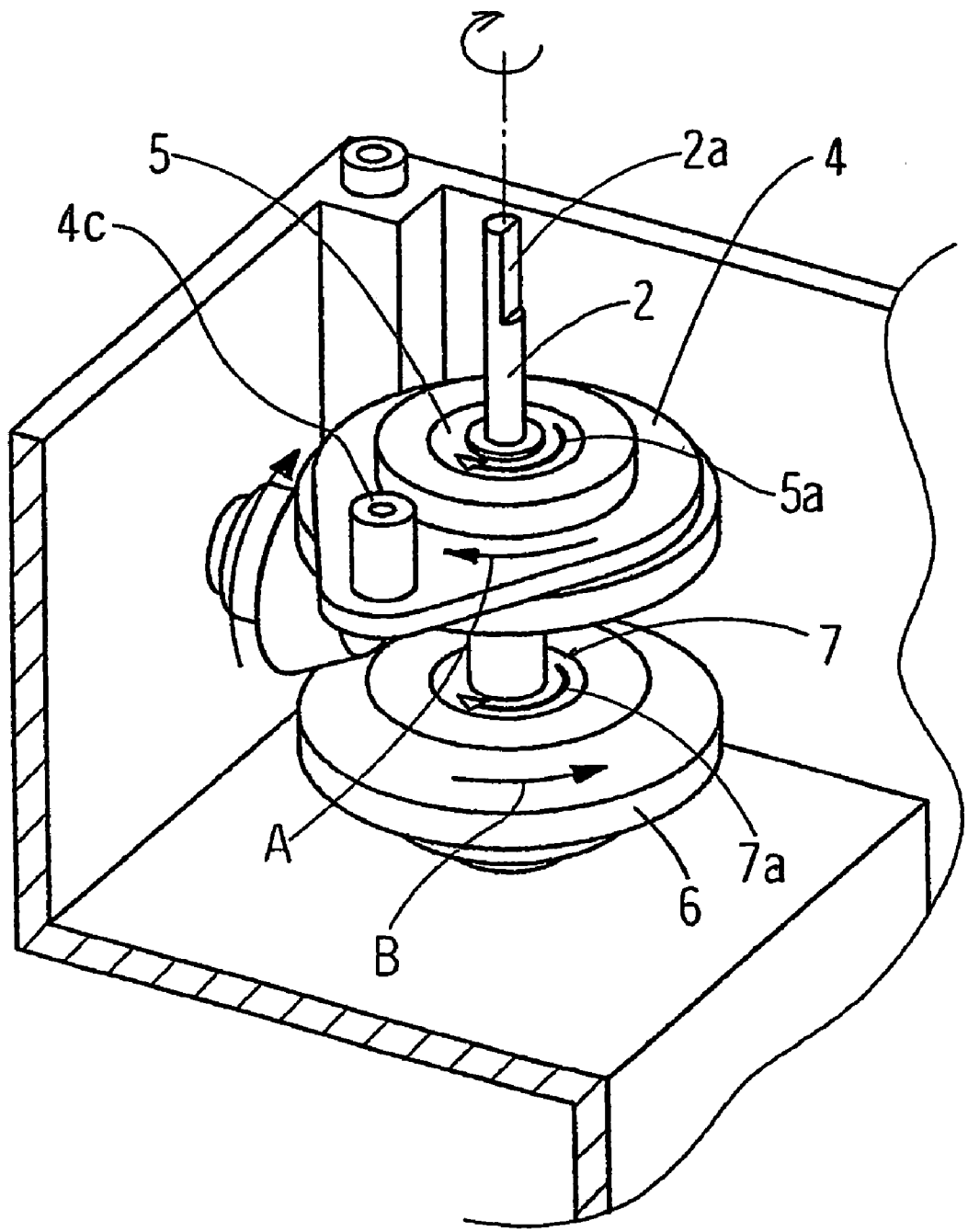
FIG. 5 is a view showing a turning direction of each of parts at a time of forward oscillation.
Figure 6:
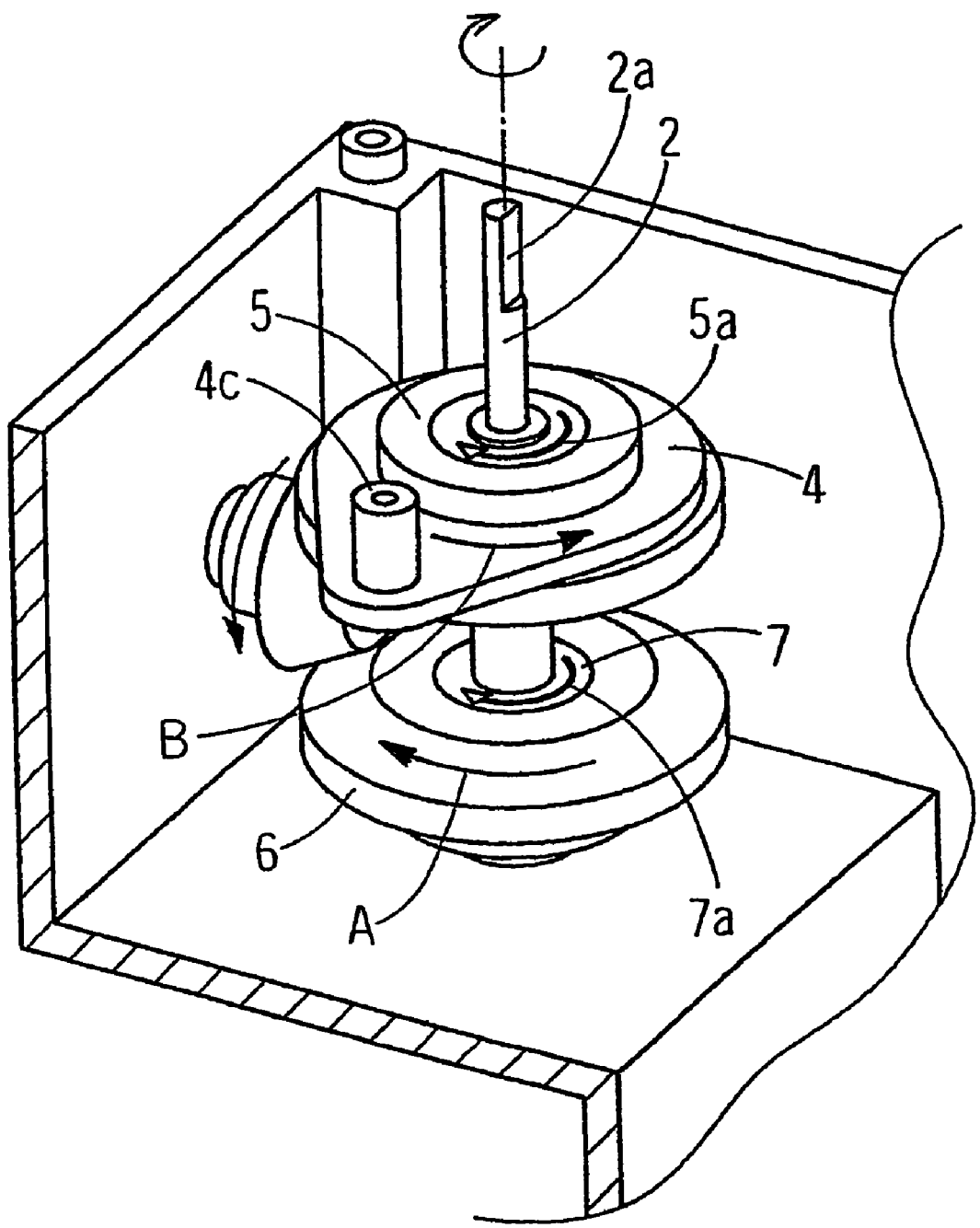
FIG. 6 is a view showing a turning direction of each of the parts at a time of backward oscillation.

An explanation is given of an operation of the clutch with reference to FIGS. 5 and 6. The first and second one-way clutches 5 and 7 are locked so as to drive the output shaft 2 in the case of being driven in direction of arrows in the engraved marks 5a and 7a, and in the case that the first and second one-way clutches 5 and 7 are driven in opposite directions of the arrows, the first and second one-way clutches 5 and 7 are free, and the output shaft 2 is not driven. The first and second one-way clutches 5 and 7 are structured such as to be locked in the same direction.

An explanation is given of a case that the rocker arm 4 is driven in a direction A. When the rocker arm 4 is driven in the direction A, the bevel gear 6 is driven in an opposite direction B to that of the rocker arm 4 on the basis of an engagement with the bevel gear. At this time, the first one-way clutch 5 and the output shaft 2 are locked, and drives the output shaft 2 in the direction A. The second one-way clutch 7 and the output shaft 2 are free.

An explanation is given of a case that the rocker arm 4 is driven in a direction B inversely to the case in FIG. 5. When the rocker arm 4 is driven in the direction B, the bevel gear 6 is driven in the opposite direction A to that of the rocker arm 4 on the basis of an engagement of the bevel gear. At this time, the first one-way clutch 5 and the output shaft 2 are free, and the second one-way clutch 7 and the output shaft 2 are locked, thereby driving the output shaft 2 in the direction A. As mentioned above, whichever direction the rocker arm 4 is driven, the output shaft is driven in the direction A.

Figure 7:
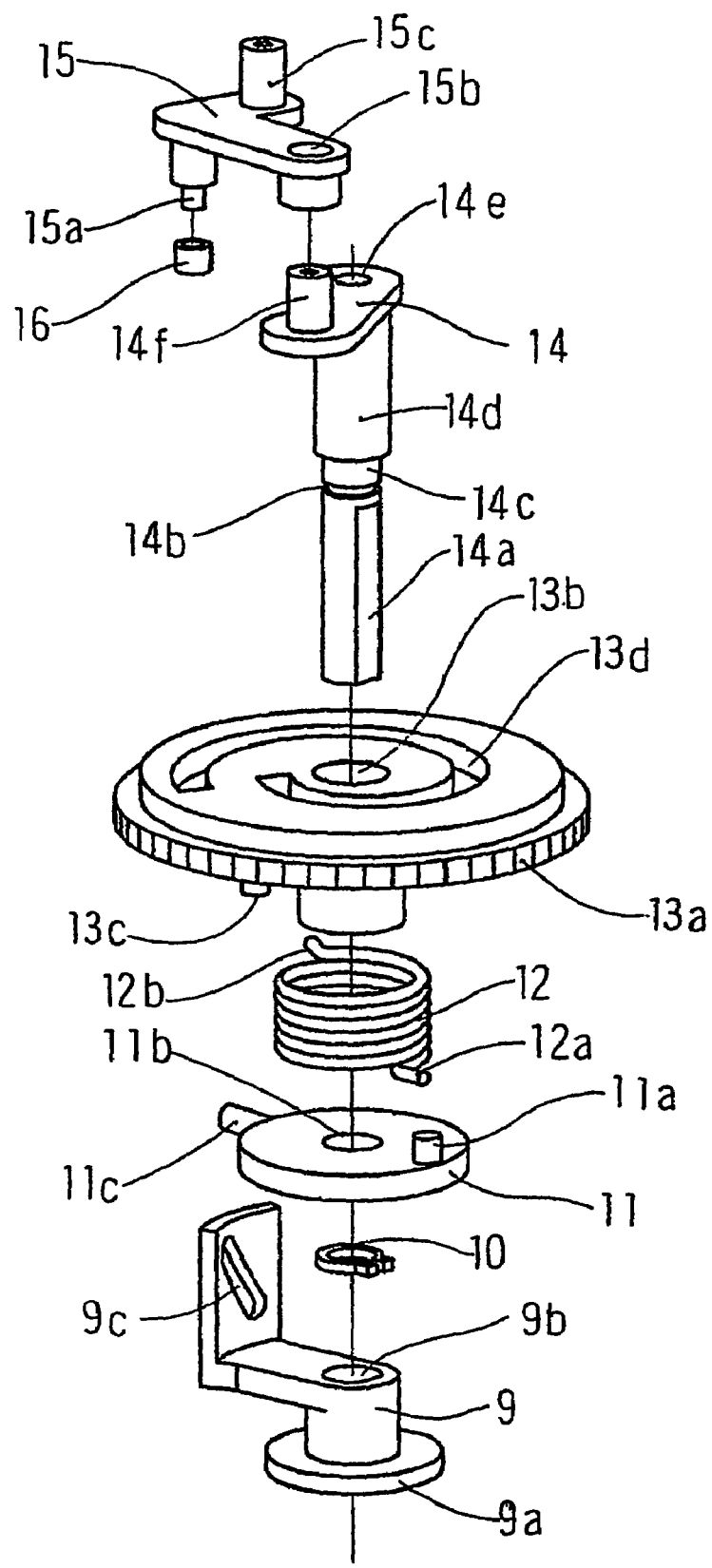
FIG. 7 is a view showing an assembly of a mechanism for changing a crank radius.

FIG. 7 is a view showing a structure of a mechanism for changing a crank radius. Reference numeral 9 denotes a slide cam part sliding in an axial direction and structured such as to change an energizing force of an energizing spring 12. The slide cam part 9 has a through D-cut hole 9b and a flange portion 9a. The slide cam part 9 is formed by a material having a low friction coefficient. Reference numeral 10 denotes a C-type retaining ring. Reference numeral 11 denotes a spring peg disc. The spring peg ring 11 has an axial hole 11b, a spring peg pin 11a and a cam shaft 11c, and the cam shaft 11c is engaged with the cam hole 9c. Reference numeral 12 denotes an energizing spring. A spring peg portion 12a is hooked to the spring peg pin 11a, and another spring peg portion 12b is hooked to a spring peg pin 13c provided in an input side turning body 13. The input side turning body 13 further has a flat gear portion 13a, a groove cam portion 13d and a through axial hole 13b.

Reference numeral 14 denotes an output side turning body. The output side turning body 14 has a shaft portion 14d, is fitted to the through hole 13b of the input side turning body 13, and is free in rotation with respect to the input side turning body 13. The shaft portion 14c of the output side turning body 14 is fitted to the axial hole 11b of the spring peg disc 11, and is free in rotation. Reference symbol 14b denotes a retaining ring groove. The retaining ring 10 is assembled in the retaining ring groove 14b, after the input side turning body 13, the energizing spring 12 and the spring peg disc 11 are assembled in the output side turning body 14. A D-cut shaft portion 14a is provided in the leading end portion of the output side turning body 14, and the output side turning body 14 and the slide cam part 9 are constrained in a rotational direction by engaging the D-cut shaft portion 14a with the D-cut hole 9b of the slide cam part 9, and are free to move in an axial direction. Further, the output side turning body 14 has a rotation axis 14f corresponding to a center of rotation of the crank shaft lever 15, and a through hole 14e corresponding to a center of rotation.

Reference numeral 15 denotes a crank shaft lever. The crank shaft lever 15 has an axial hole 15b, is fitted to the rotation axis 14f of the output side turning body 14, and is free in rotation. Reference symbol 15a denotes a roller shaft. A roller 16 is fitted to the roller shaft 15a. The roller 16 is engaged with a cam groove 13d of the input side turning body 13. The crank shaft lever 15 is provided with a drive shaft 15c for driving a connection rod mentioned below.

In the case that the input side turning body 13 is rotated by structuring in the manner mentioned above, the output side turning body 14 is rotated via the energizing spring 12. Accordingly, relative angular positions of the input side turning body 13 and the output side turning body 14 are changed in correspondence to a load of the output side turning body 14, and the crank shaft lever 15 is oscillated by the cam groove 13d. In the present invention, the cam groove is formed such that the cam groove is close to the drive shaft 15c of the crank shaft lever and the rotation center 14e of the output side turning body 14 in accordance with an increase of the load. The structure is made such that in the case that the load is increased as mentioned above, a crank radius r in FIG. 1 becomes small, and the change gear ratio becomes large.

Figure 8:
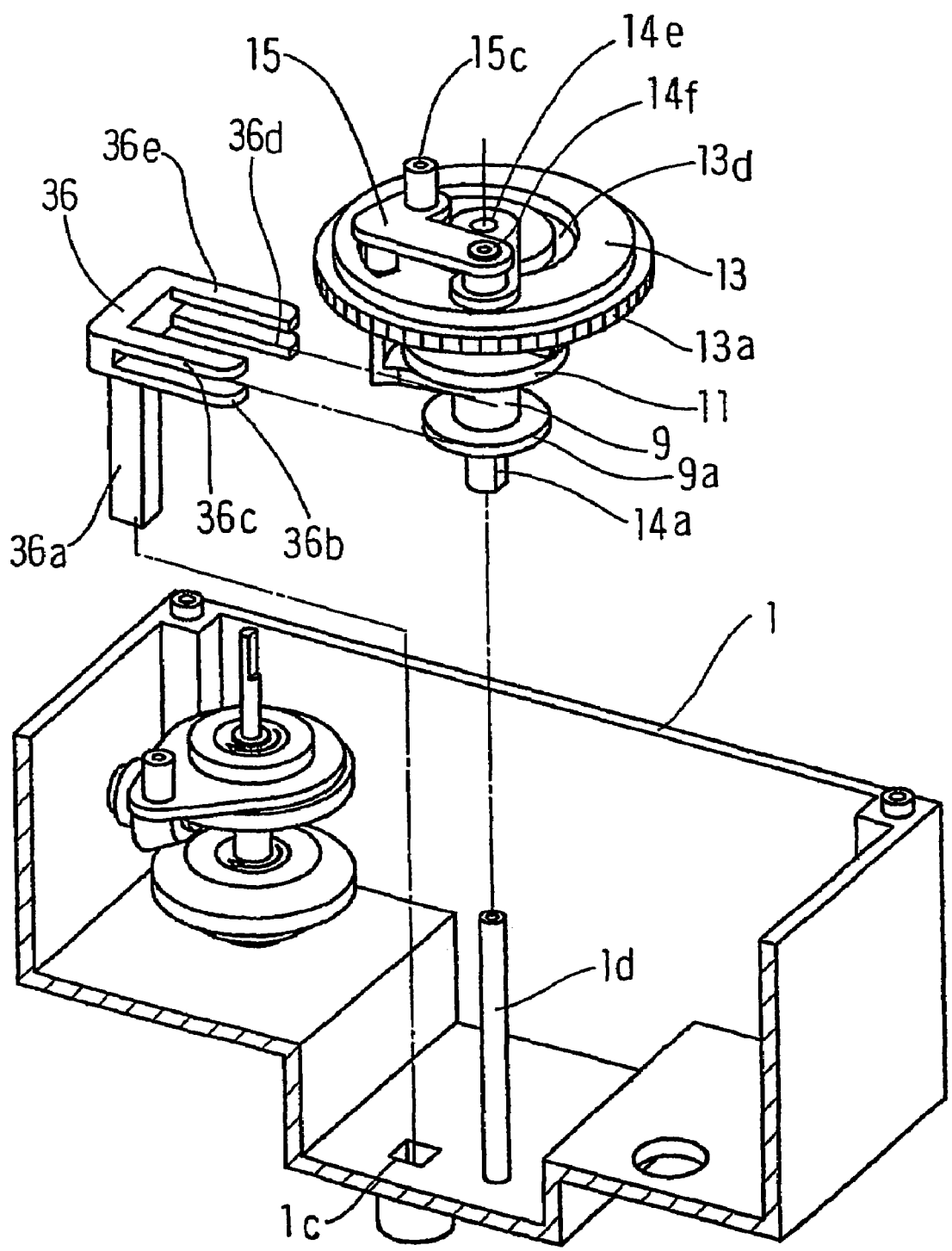
FIG. 8 is a view showing an assembly of a mechanism for changing a shift transmission property.

Next, an explanation is given of a mechanism for adjusting the energizing force of the energizing spring 12 and changing the shift transmission property. An explanation is given of the structure with reference to FIG. 8. Reference numeral 36 denotes a property adjusting part. The property adjusting part 36 has a square shaft 36a, is engaged with the adjusting hole 1c of the case 1, and can be constrained to the case 1 in a rotational direction and be moved in a vertical direction in the drawing with respect to the case 1. The property adjusting part 36 has engagement portions 36b, 36c, 36d and 36e for engaging with the flange portion 9a of the slide cam part 9 and moving in an axial direction. The parts structured in FIG. 7 are assembled in the rotation shaft 1d of the case 1, and freely rotate.

Figure 9:
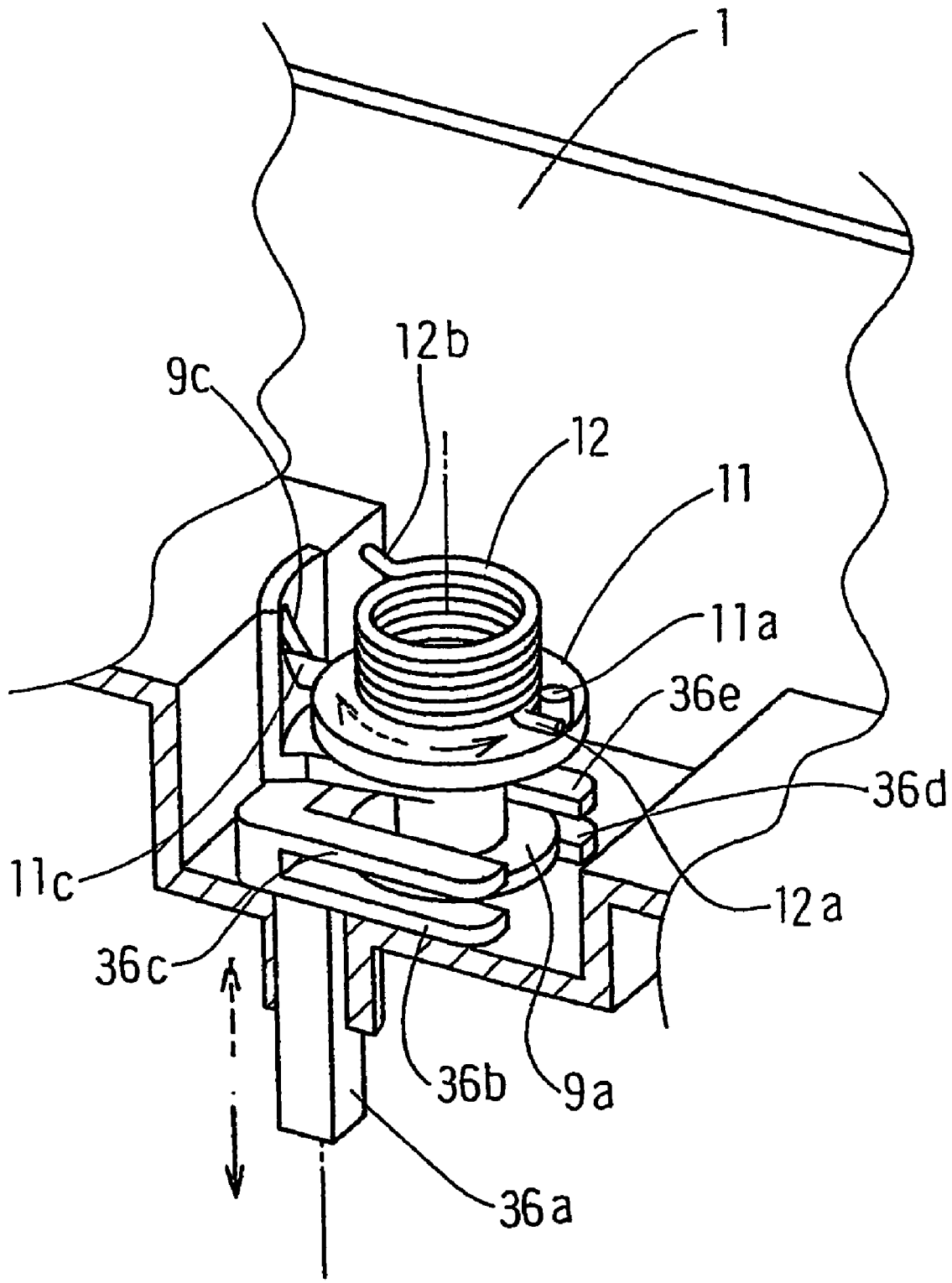
FIG. 9 is a view showing an operation at a time of changing the property.

An explanation is given of an adjusting operation of the shift transmission property with reference to FIG. 9. There are parts which are not illustrated for clearly understanding the drawing. A method of changing the shift transmission property is achieved by adjusting the energizing force of the energizing spring 12. In the present invention, if the load of the output shaft 2 is increased, a turning angle of the input side turning body 13 becomes large with respect to the output side turning body 14, and if the turning angle is increased, the change gear ratio becomes large. Accordingly, if the energizing force of the energizing spring 12 is small, there is generated a property that the change gear ratio becomes larger on the basis of the smaller load, and if the energizing force is large, there is generated a property that the change gear ratio becomes smaller with respect to the load.

An explanation is given of the operation. In FIG. 9, in the case that the property adjusting part 36 is moved in a downward direction (in a solid arrow direction in the drawing), the slide cam part 9 is also slid in a downward direction. Accordingly, the spring peg disc 11 is rotated in a solid arrow direction in the drawing by the cam shaft 11c engaged with the cam hole 9c. At this time, the spring peg portion 12a of the energizing spring 12 is moved so as to weaken the energizing force. In accordance that the energizing force is weakened, there is generated a property that the change gear ratio becomes larger on the basis of the smaller load. On the contrary, in the case that the property adjusting part 36 is moved in an upward direction (a broken line arrow direction in the drawing), the spring peg disc 11 is rotated in a broken line arrow direction in the drawing, the energizing force of the energizing spring 12 becomes strong, whereby there is generated a property that the change gear ratio is small with respect to the load. In this case, the slide cam part 9 and the output side turning body 14 are constrained in the rotational direction by the D-cut hole and the D-cut shaft, and the slide cam part 9 integrally turns together with the output side turning body 14, however, the shift transmission property can be changed by moving the property adjusting part 36 in a vertical direction even during the turning.

Figure 10:
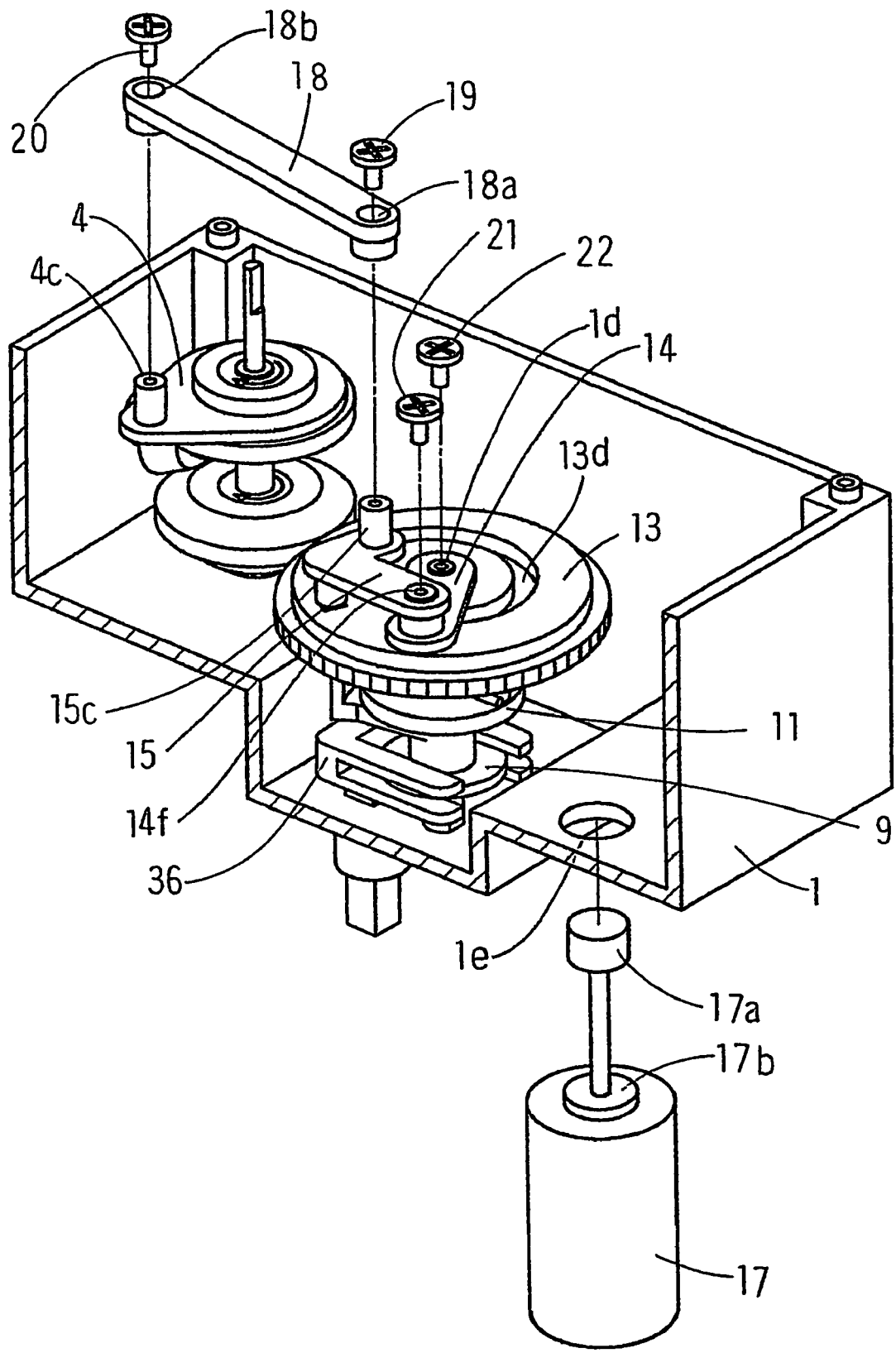
FIG. 10 is a view showing an assembly of a connection rod and a motor.

Next, an explanation is given of an assembly of the connection rod and the motor with reference to FIG. 10. Reference numeral 17 denotes a direct-current motor corresponding to the drive source. The direct-current motor 17 is constituted by a pinion 17a and a positioning portion 17b. The positioning portion 17a is positioned by the positioning hole 1e of the case 1, and is fixed by a method such as a double-faced tape, an adhesive bonding, a screwing and the like, and the pinion 17a is engaged with the flat gear portion 13a of the input side turning body 13. Reference numeral 18 denotes a connection rod. The connection rod 18 has link holes 18a and 18b in both ends. The link hole 18a is fitted to the drive shaft 15c of the crank shaft lever 15, and is prevented by the screw 19 from coming off. The linkhole 18b is fitted to the drive shaft 4c of the rocker arm 4, and is prevented by the screw 19 from coming off. A screw 21 is screwed into the rotation axis 14f of the input side turning body 14 so as to prevent the crank shaft lever 15 from coming off. A screw 22 is screwed into the rotation axis 1d of the case 1 so as to prevent the output side turning body 14 from coming off.

Figure 11:
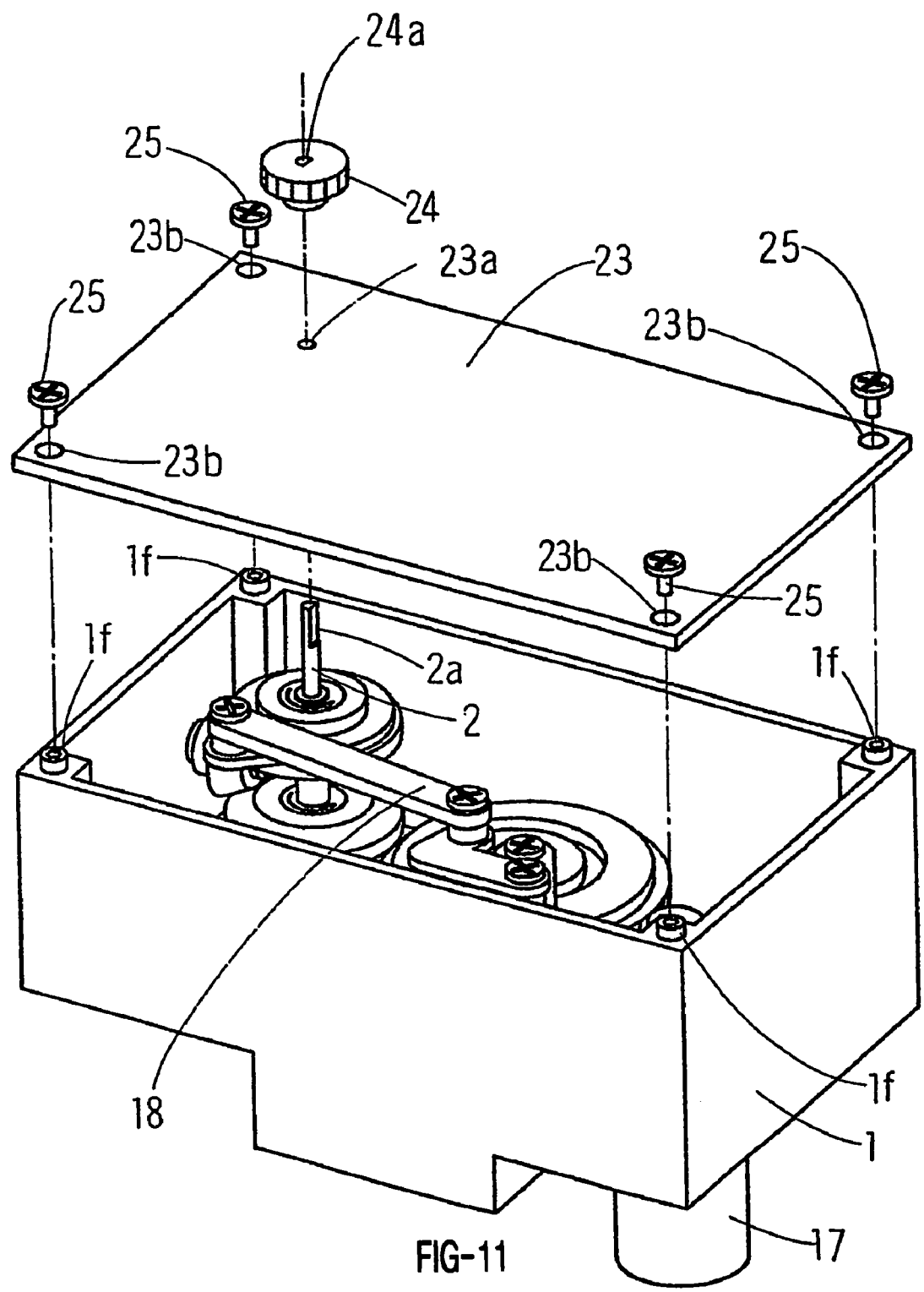
FIG. 11 is a view showing a final assembly.

FIG. 11 is a view showing a structure of a final assembly. Positioning dowels 1f each having a threaded hole are provided in four inner portions of the case 1, and are inserted and positioned to holes 23b of a cover 23, and the cover 23 is fixed by four screws 25. The cover 23 has a rotation axis hole 23a of the output shaft 2. Reference numeral 24 denotes an output gear. The output gear 24 has a D-cut hole 24a, and is fixed to the D-cut portion 2a of the output shaft 2 in accordance with a press fitting, an adhesive bonding, a screwing or the like after the cover 23 is assembled. The output gear 24 is connected to every driving devices such as a vehicle, a machine tool, an electric device and the like prior thereto. The assembly is completed in accordance with the above-mentioned steps.

Figure 12:
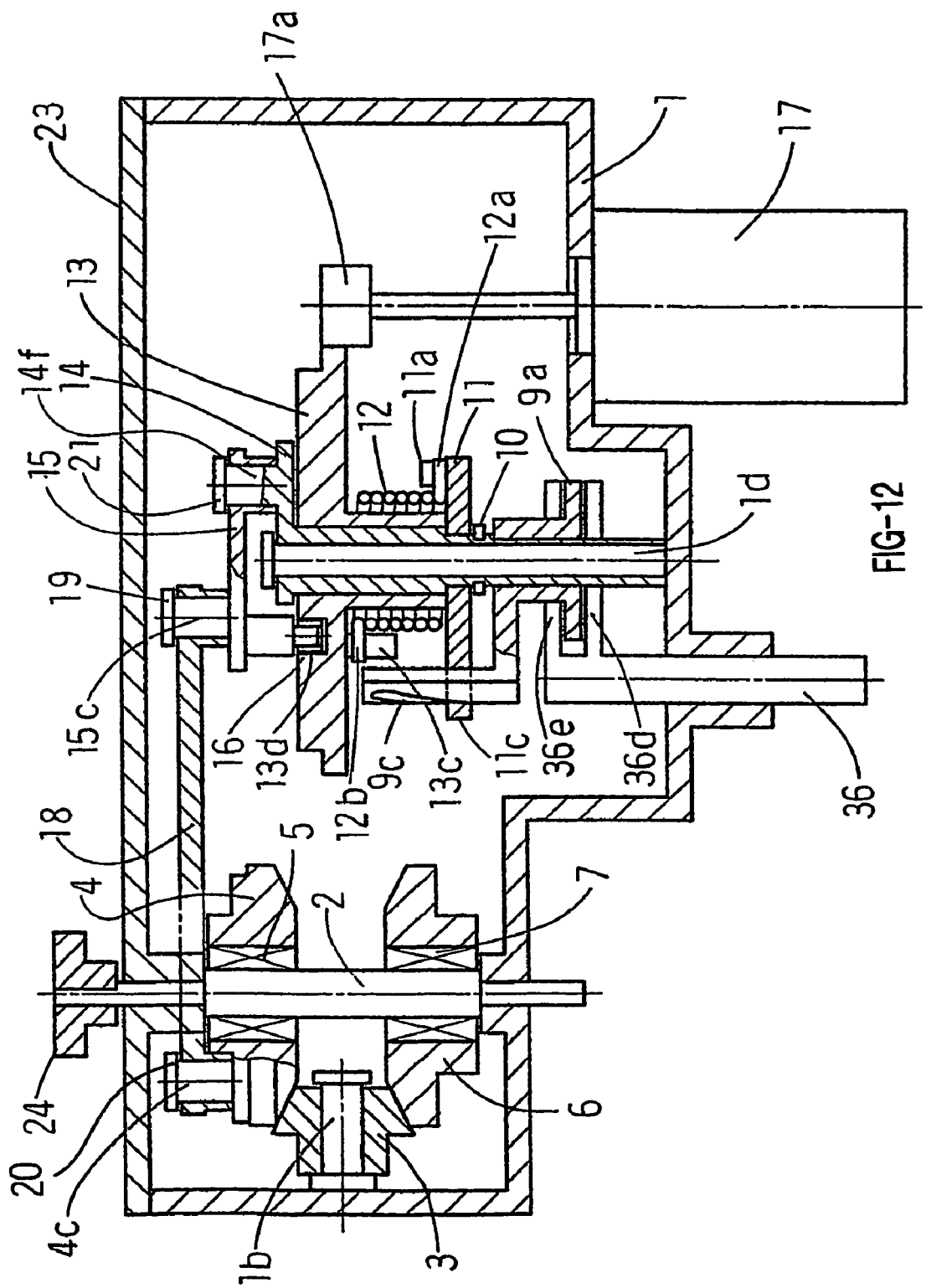
FIG. 12 is a cross sectional view of a first embodiment.

FIG. 12 shows a cross sectional view after being finished.

Figure 13:
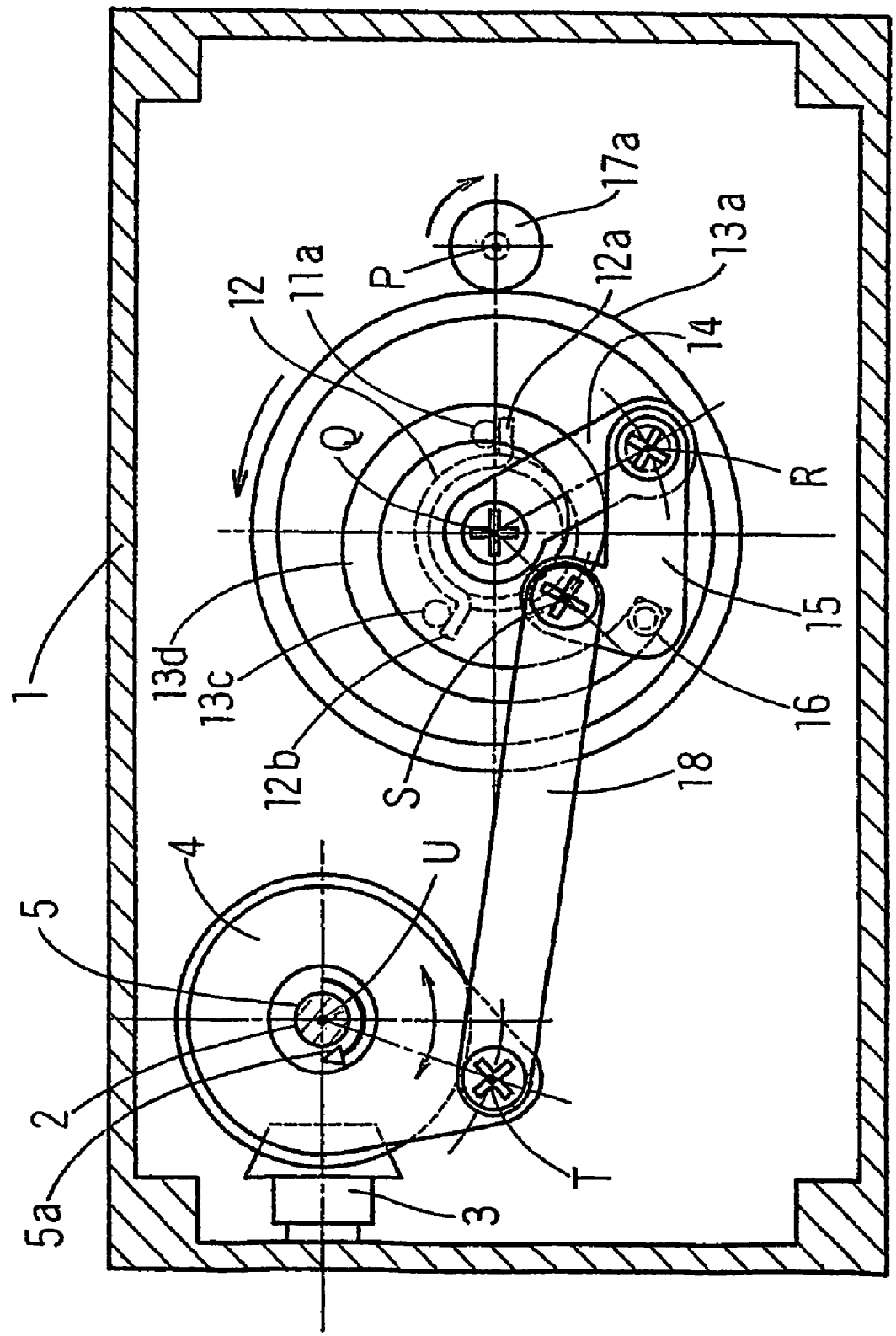
FIG. 13 is a view explaining an operation of the present invention (at a time of a light load).

An explanation is given of an operation of the non-stage transmission which is assembled and structured in the manner mentioned above. FIG. 13 shows a main portion of the present invention, and the explanation is given with reference to this drawing. When the pinion 17a of the electric motor 17 turns in a clockwise direction around a point P, the input side turning body 13 is rotated in a counterclockwise direction around a point Q by the flat gear portion 13a. The spring peg pin 13c pushes the spring peg portion 12b and energizes the energizing spring 12. Another spring peg portion 12a of the energizing spring 12 is hooked to the spring peg pin 11a of the spring peg disc 11. In the case that the property adjusting part 36 is fixed in the axial direction as described in FIG. 9, the output side turning body 14 and the spring peg disc 11 are constrained in the rotational direction.

On the other hand, in the case that the load is generated in the output shaft 2, the load is also generated in the reciprocating rocker arm 4. The load is transmitted to the output side turning body 14 via the crank shaft lever 15 by the connection rod 18. If the load of the output shaft 2 is small, and the load transmitted to the output side turning body 14 is smaller than the pretension of the energizing spring 12, a distance between points Q and S, that is, the crank shaft radius is maximum as shown in FIG. 13, an oscillating angle of the rocker arm 4 is maximum, and the change gear ratio becomes minimum.

Figure 14:
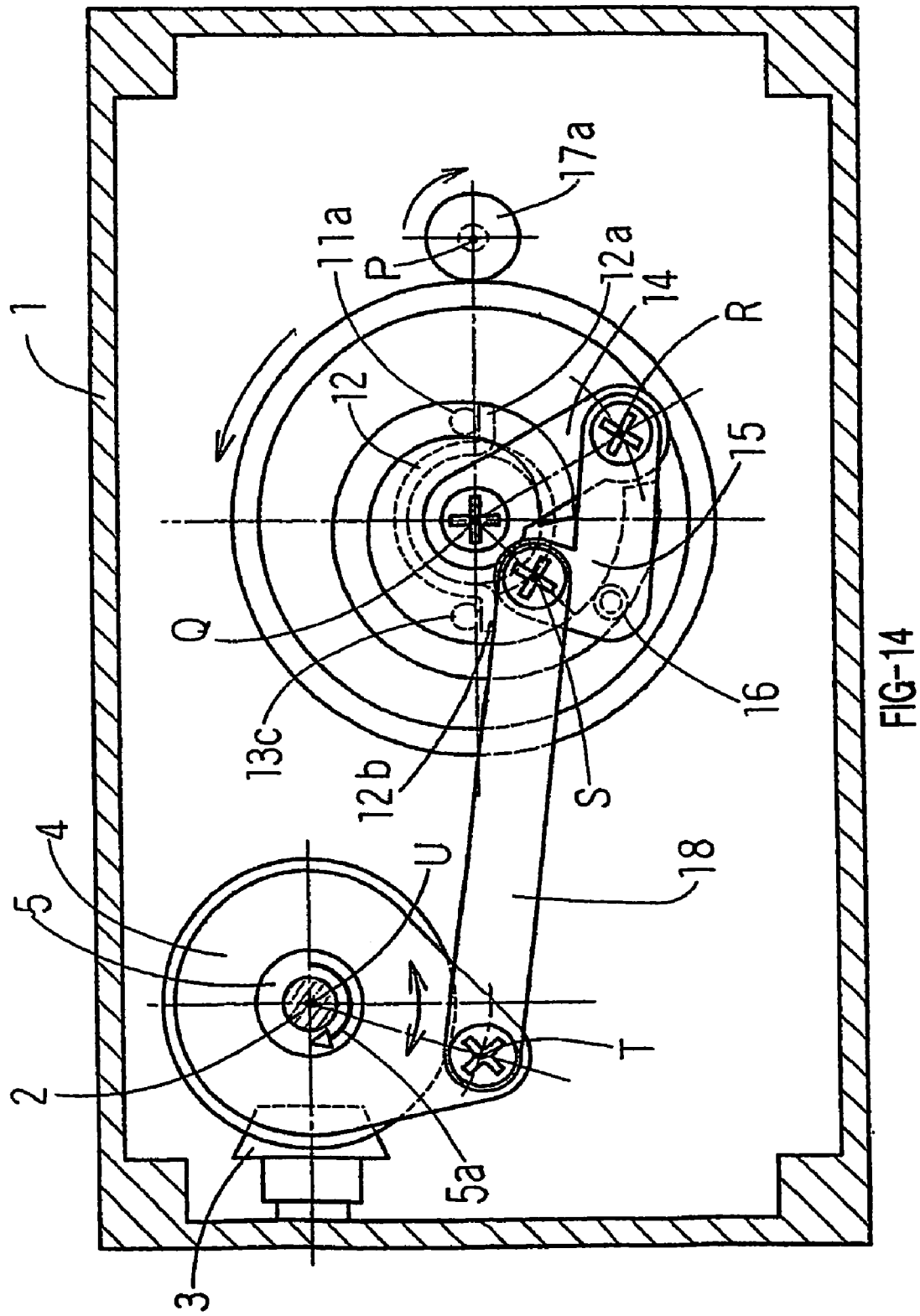
FIG. 14 is a view explaining an operation of the present invention (at a time of a middle load).

Further, an explanation is given of a case that the load of the output shaft 2 is increased, with reference to FIG. 14. When the load of the output shaft 2 is increased, the load transmitted to the output side turning body 14 via the connection rod 18 and the crank shaft lever 15 is increased. If the load becomes larger than the pretension of the energizing spring 12, the input side turning body 13 starts relatively rotating with respect to the output side turning body 14 while energizing the energizing spring 12. Then, the crank shaft lever 15 is rotated in a clockwise direction around a point R by the roller 16 and the cam groove 13*d*, and the distance between the points Q and S becomes small. When the distance between the points Q and S (the radius of the crank shaft) becomes small, the force reciprocating the rocker arm 4 via the connection rod 18 becomes large, and the oscillation angle becomes small. In other words, the change gear ratio becomes large.

As mentioned above, the larger the load of the output shaft 2 is, the larger the angle at which the input side turning body 13 is relatively rotated with respect to the output side turning body 14 is. Further, the larger the angle is, the smaller the radius of the crank shaft is, by the cam groove 13*d*. Since the output shaft 2 is returned by the energizing force of the energizing spring 12 in the case that the load of the output shaft 2 becomes small, the relative rotation of the input side turning body 13 with respect to the output side turning body 14 becomes small, and the change gear ratio becomes small. As mentioned above, it is possible to always obtain the change gear ratio in response to the load.

Figure 15:
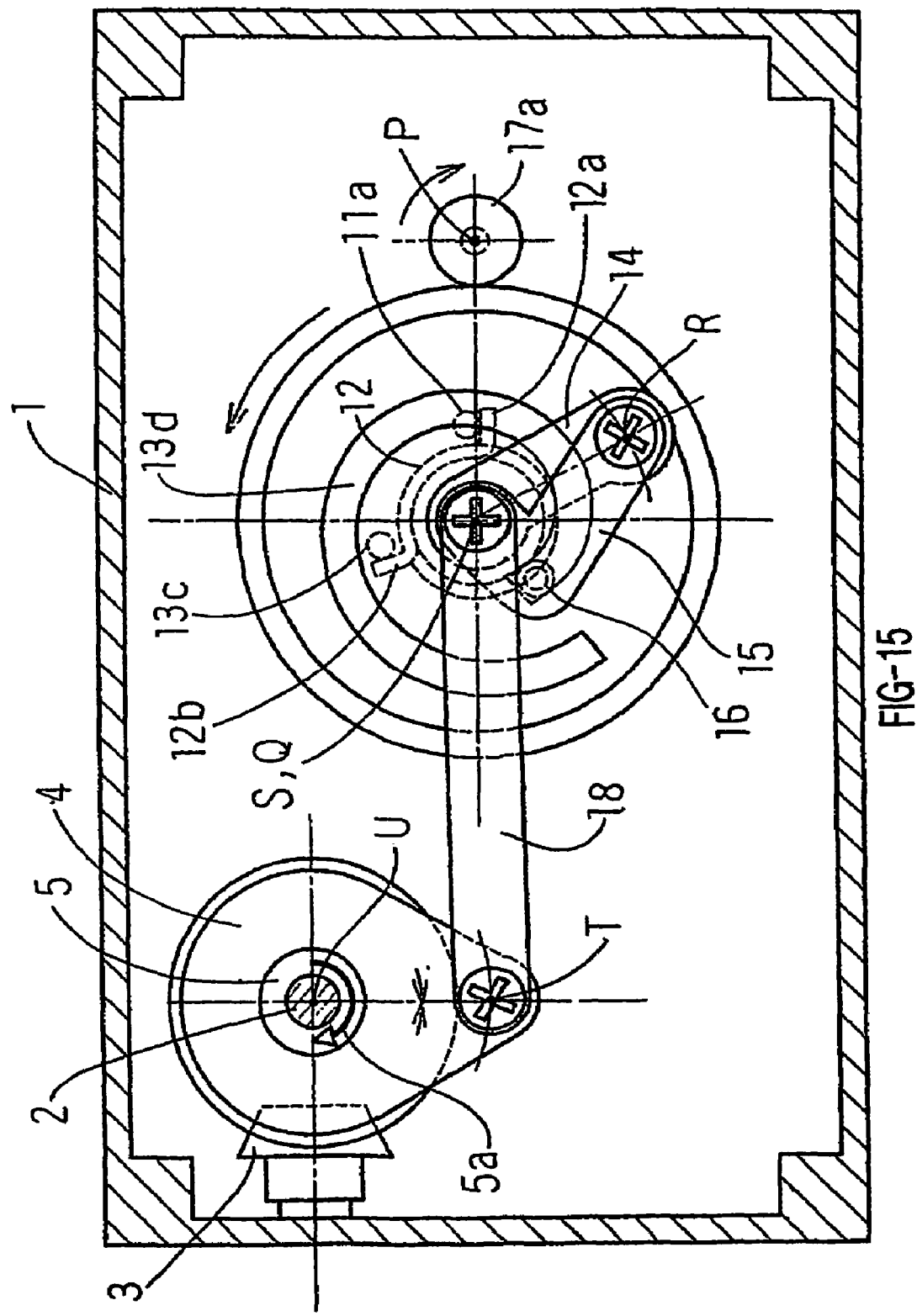
FIG. 15 is a view explaining an operation of the present invention (at a time of abnormal load).
Figure 18:
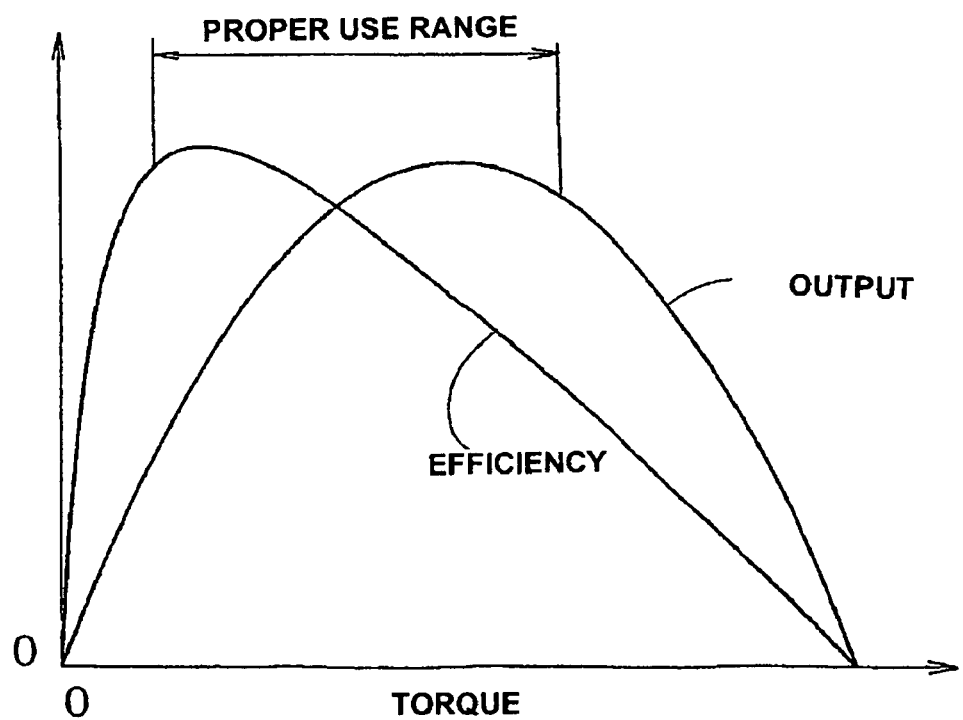
FIG. 18 is a view showing a proper use range of a motor.

A description will be given of a case that the load of the output shaft 2 is abnormally large with reference to FIG. 15. The relative turning angle of the input side turning body 13 with respect to the output side turning body 14 is further increased, and the crank shaft lever 15 is rotated in a clockwise direction on the basis of a contact with the cam groove 13*d*, and is rotated until the distance between the points Q and S (the radius of the crank shaft) becomes 0. At this time, the oscillating angle of the rocker arm 4 becomes 0, and the change gear ratio becomes infinitely great. Since the motor runs idle at this time, the parts of the non-stage transmission and the parts of the device in which the non-stage transmission is assembled are not broken even in the case that an overload is generated. Further, since the used motor is not locked, no great current flows, and a good influence is applied to the electric circuit. It is possible to easily change the shift transmission property as mentioned above. A non-stage transmission which can be used in a more proper change gear ratio with respect to every loads, can be provided by setting the initially set change gear ratio small as mentioned above, structuring such that the change gear ratio becomes larger in accordance that the load becomes larger, and structuring such that the maximum change gear ratio is infinitely great. An explanation is given of setting the more proper shift transmission property of the non-stage transmission of the present invention with reference to FIG. 18. Since the non-stage transmission of the present invention shifts gear in correspondence to the load as mentioned above, it is possible to use a most proper use range of the motor, the internal combustion engine and the human power corresponding to the power source, in every load ranges, by properly setting the energizing force of the energizing spring 12 or properly setting the shape of the groove cam 13*d*. FIG. 18 is a view showing an efficiency and an output of a well-known direct-current electric motor, in which a horizontal axis indicates a torque. A proper use range of the direct-current electric motor is generally in an area in which the efficiency is the maximum range and the output is the maximum range. In order to set the power source to the proper use range, it is necessary to adjust the energizing force of the energizing spring 12 as mentioned above.

In this case, the explanation is given of the case that the power source is constituted by the direct-current electric motor, however, the proper use range exists in the same manner in the case of the internal combustion engine, an external combustion engine, the human power and the like. In the internal combustion engine, the external combustion engine and the like, the proper use range is a range in which a specific fuel consumption is a minimum amount, a range in which a vibration and a noise are minimum, a range in which the output is maximum, and the like. A use range having a good efficiency exists in the same manner with respect to the human power, and a needless labor is reduced by adjusting the energizing force of the energizing spring 12 so as to use the range. However, there is a case that idle running in the input side is considered to be more proper as described in FIG. 15 in the case that the overload is generated such as the lock in the output shaft side or the like, and there is a peculiar point which is out of the proper use range, in the portion which is affected more by an inertia moment than the load at the initial motion. However, it is possible to use the efficiency, the noise, the output and the like in the advantageous part of the power source, by using the proper use range almost in all the ranges.

Embodiment 2

Figure 16:
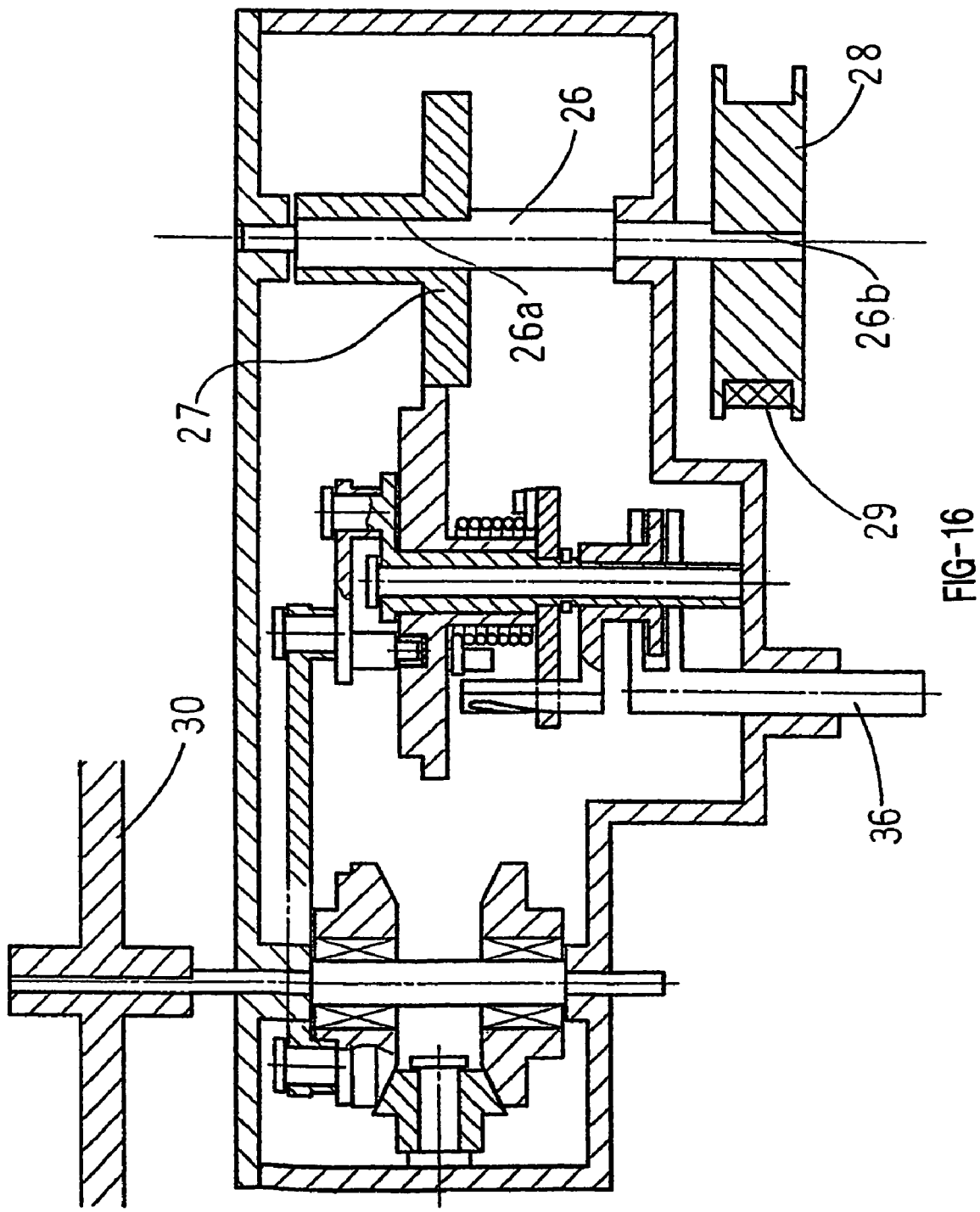
FIG. 16 is a cross sectional view of a second embodiment.

Next, an explanation is given of a case that the non-stage transmission is used in a bicycle. FIG. 16 shows a cross sectional view of a non-stage transmission used therein. Since the structure is approximately the same as the structure in the embodiment mentioned above, an explanation is given only of the different parts.

Reference numeral 26 denotes an input shaft. An input gear 27 having a D-cut hole is inserted to a D-cut portion 26*a*. Further, a timing pulley 28 is fixed to a D-cut portion 26*b* by a set bolt or the like. Reference numeral 29 denotes a timing belt. A rear wheel 30 having a D-cut hole is fitted and fixed to a D-cut portion 2*a* of an output shaft 2.

Figure 17:
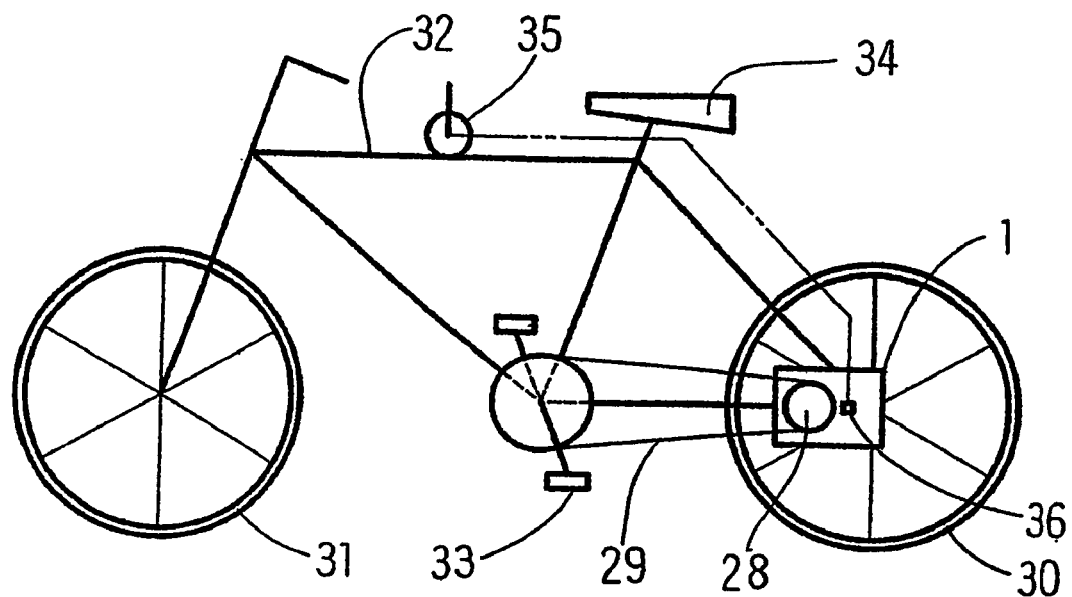
FIG. 17 is a view showing a bicycle of a second embodiment.

FIG. 17 is a bicycle using the present invention. The bicycle is constituted by a front wheel 31, the rear wheel 30, a frame 32, a pedal 33, a saddle 34 and the like. In this case, when the pedal 33 is rotated, the timing pulley 28 is rotated by the timing belt 29. Accordingly, a change gear ratio is achieved in correspondence to a load of the rear wheel 30 as mentioned above, and the rear wheel 30 is driven. For example, the change gear ratio is automatically increased in an upward slope, and the change gear ratio is automatically reduced in a downward slope.

Since the bicycle is different in a force for turning the pedal on the basis of a sex, a physical condition and the like of a rider, the property can be adjusted. The property can be changed by moving the property adjusting part 36 as mentioned above, however, the property adjusting part 36 is connected to an operating member 35 by a wire or the like for changing the property during the riding.

INDUSTRIAL FIELD OF APPLICATION

As mentioned above, in accordance with the present invention, since the change gear ratio can be automatically changed in response to the load, an actuator for shifting gear is not required, and it is possible to achieve a low-cost and small-sized structure. Further, since the power source side such as the motor, the internal combustion engine, the human power and the like can be set to an approximately fixed power on the basis of the load sensitive type, it is possible to use only an efficient point approximately in all the range, and an improved energy efficiency can be achieved. Further, an advantageous range can be used approximately in all the range on the basis of the adjustment with respect to the noise, the output and the like. Since it is possible to make the change gear ratio large, and the structure is made such that in the case that the overload is generated, the change gear ratio becomes infinitely large, and the power source runs idle, the parts are not broken due to the overload. As mentioned above, the present invention is effective for every kind of devices such as the vehicle, the machine tool, the electric device and the like in which the transmission mechanism and the power source are assembled.

What is claimed is:

1. A mechanical device having a non-stage transmission and a non-stage change gear ratio, the mechanical device further having a spring means provided between an input side and an output side thereof which deforms in accordance with load energy generated at the output side, and means to mechanically change the gear ratio correspondingly to the amount of displacement generated between the input side and the output side in accordance with the deformation of the spring means, wherein the torque at the output side changes in accordance with the change in gear ratio, and wherein an initial change gear ratio is set to be small, and the change gear ratio is increased in correspondence to an increase of a load.

2. A mechanical device having a non-stage transmission and a non-stage change gear ratio as claimed in claim 1, wherein the means for changing the change gear ratio in response to the load is structured to change the change gear ratio in response to a magnitude of a load without using any other actuator for changing.

3. A mechanical device having a non-stage transmission and a non-stage change gear ratio as claimed in claim 1, wherein the structure is made to use a proper use range of an input side power source.

4. A mechanical device having a non-stage transmission and a non-stage change gear ratio as claimed in claim 3, wherein the proper use range of the input side power source is a range from a portion near an energy efficiency maximum portion to a portion near an output maximum portion.

5. A mechanical device having a non-stage transmission and a non-stage change gear ratio as claimed in claim 3, wherein the proper use range of the input side power source is a portion near an energy efficiency maximum range.

6. A mechanical device having a non-stage transmission and a non-stage change gear ratio as claimed in claim 3, wherein the proper use range of the input side power source is a portion near an output maximum range.

7. A mechanical device having a non-stage transmission and a non-stage change gear ratio as claimed in claim 3, wherein the proper use range of the input side power source is a portion near a noise and vibration minimum range.

8. A mechanical device having a non-stage transmission and a non-stage change gear ratio as claimed in claim 1, wherein the structure is made such that a change gear ratio is infinitely large in the case that an overload is generated in an output side.

9. A mechanical device having a non-stage transmission and a non-stage change gear ratio as claimed in claim 1, wherein said load is detected mechanically by a one of a spring means, cam mechanism means, lever means, and combinations thereof.

10. A mechanical device having a non-stage transmission and a non-stage change gear ratio, the mechanical device further having a spring means provided between an input side and an output side thereof which deforms in accordance with load energy generated at the output side, and means to mechanically change the gear ratio correspondingly to the amount of displacement generated between the input side and the output side in accordance with the deformation of the spring means, wherein the torque at the output side changes in accordance with the change in gear ratio, and wherein the structure is made such that a change gear ratio is infinitely large in the case that an overload is generated in the output side.

11. A mechanical device having a non-stage transmission and a non-stage change gear ratio, the mechanical device further having a spring means provided between an input side and an output side thereof which deforms in accordance with load energy generated at the output side, and means to mechanically change the gear ratio correspondingly to the amount of displacement generated between the input side and the output side in accordance with the deformation of the spring means, wherein the torque at the output side changes in accordance with the change in gear ratio, and wherein the structure is made to use a proper use range of an input side power source, and wherein the proper use range of the input side power source is a portion near a noise and vibration minimum range.

* * * * *